United States Patent
Alden

(10) Patent No.: US 7,765,617 B2
(45) Date of Patent: Aug. 3, 2010

(54) PROTECTIVE HAND COVER

(75) Inventor: David A. Alden, Beverly Hills, CA (US)

(73) Assignee: Foreston Trends, Long Beach, CA (US)

( * ) Notice: Subject to any disclaimer, the term of this patent is extended or adjusted under 35 U.S.C. 154(b) by 96 days.

(21) Appl. No.: 11/871,499

(22) Filed: Oct. 12, 2007

(65) Prior Publication Data

US 2009/0094722 A1    Apr. 16, 2009

(51) Int. Cl.
*A41D 19/01* (2006.01)
*A41D 13/00* (2006.01)
*A41D 19/00* (2006.01)
*A47J 45/10* (2006.01)

(52) U.S. Cl. .................... 2/158; 2/20; 2/161.6; 16/435; D29/118

(58) Field of Classification Search .................... 16/435; 2/16, 20, 158, 159, 161.3, 161.4, 161.6, 161.8, 2/168, 907, 910, 917; 294/25; D29/113, D29/117.1, 117.2, 118, 119, 123
See application file for complete search history.

(56) References Cited

U.S. PATENT DOCUMENTS

| | | | | |
|---|---|---|---|---|
| 1,495,389 | A | * | 5/1924 | Heimerl et al. ............... 15/227 |
| 1,714,648 | A | * | 5/1929 | Walker ........................ 2/158 |
| 1,955,989 | A | * | 4/1934 | Uhri ............................ 2/20 |
| 2,937,378 | A | * | 5/1960 | Mackay et al. ............... 2/158 |
| 4,085,464 | A | | 4/1978 | Simonoff |
| 4,388,743 | A | | 6/1983 | Hellinger et al. |
| 4,411,026 | A | | 10/1983 | Secter |
| 5,134,746 | A | | 8/1992 | William |
| 5,514,255 | A | | 5/1996 | Gautsch |
| 5,609,431 | A | | 3/1997 | Carroll |
| 5,884,883 | A | | 3/1999 | Millington |
| 6,010,431 | A | | 1/2000 | Taylor |
| D425,261 | S | * | 5/2000 | Basile ........................ D29/118 |
| 6,145,128 | A | * | 11/2000 | Suzuki ........................... 2/21 |
| 6,298,488 | B1 | | 10/2001 | Duncan et al. |
| 6,305,023 | B1 | * | 10/2001 | Barkes ............................ 2/20 |
| 6,358,235 | B1 | | 3/2002 | Osborn, III et al. |
| D464,176 | S | | 10/2002 | Cintron |
| 6,564,389 | B1 | | 5/2003 | Laughlin |
| D476,778 | S | | 7/2003 | Beyda |
| 6,658,668 | B2 | | 12/2003 | Newcomb |
| D485,647 | S | | 1/2004 | Beyda |

(Continued)

OTHER PUBLICATIONS

"Exclusively ours[SM] Kitchensmart™ Antibacterial Oven Mitt," http://www.bedbathandbeyond.com/regProduct.asp?order_num=-1&WRN=-213805915&sku=13584753, Apr. 12, 2006, 2 pages.

(Continued)

*Primary Examiner*—Gary L Welch
*Assistant Examiner*—Jane S Yoon
(74) *Attorney, Agent, or Firm*—Blakely Sokoloff Taylor & Zafman LLP

(57) ABSTRACT

An apparatus including an inner face, an outer face coupled to the inner face, an opening for receiving a hand of a wearer, and means for separating the pocket created by the coupling of the inner and outer face such that the apparatus fits securely around the wearer hand. A thumb covering is connected to the apparatus in order to allow the wearer to fully use an opposable thumb.

16 Claims, 2 Drawing Sheets

U.S. PATENT DOCUMENTS

| | | |
|---|---|---|
| 6,773,423 B2 | 8/2004 | Osborn, III et al. |
| 7,058,988 B1 | 6/2006 | Zahner |
| 7,117,536 B2 | 10/2006 | Burnett et al. |
| 7,124,446 B2 | 10/2006 | Demay et al. |
| 2002/0107497 A1 | 8/2002 | Osborn, III et al. |
| 2003/0140395 A1 | 7/2003 | Newcomb |
| 2005/0108802 A1 | 5/2005 | Burnett et al. |
| 2005/0114983 A1 | 6/2005 | Demay et al. |
| 2005/0284865 A1 | 12/2005 | Fogle et al. |
| 2006/0040021 A1 | 2/2006 | Leimkuhler |
| 2006/0042471 A1 | 3/2006 | Butt |
| 2006/0080757 A1 | 4/2006 | Beyda |
| 2006/0105304 A1 | 5/2006 | Webber |
| 2007/0224900 A1 | 9/2007 | Tucker |
| 2009/0038098 A1* | 2/2009 | Chareyron ............ 15/227 |

OTHER PUBLICATIONS

"Kitchen Grips 17-inch Oven Mitt," http://www.epinions.com/content_125029551748, Apr. 12, 2006, 3 pages.

"Duncan's Kitchen Grips Kitchen Towel KTC," http://www.pfsgrips.com/towel.htm, Apr. 12, 2006, 1 page.

"Special Contact Cover Mitt KSC," http://www.pfsgrips.com/KSC.htm, Apr. 12, 2006, 2 pages.

http://store1.yimg.com/l/rfigidaire_1888_391561, Apr. 12, 2006, 1 page.

"The Fryer™ Oven Mitt—14" Neoprene,"http://www.instawares.com/The-Fryer-Oven-Mitt--14-Neoprene.BV6786RMT.0.7.htm?GCID=C17378x0...," Apr. 12, 2006, 2 pages.

* cited by examiner

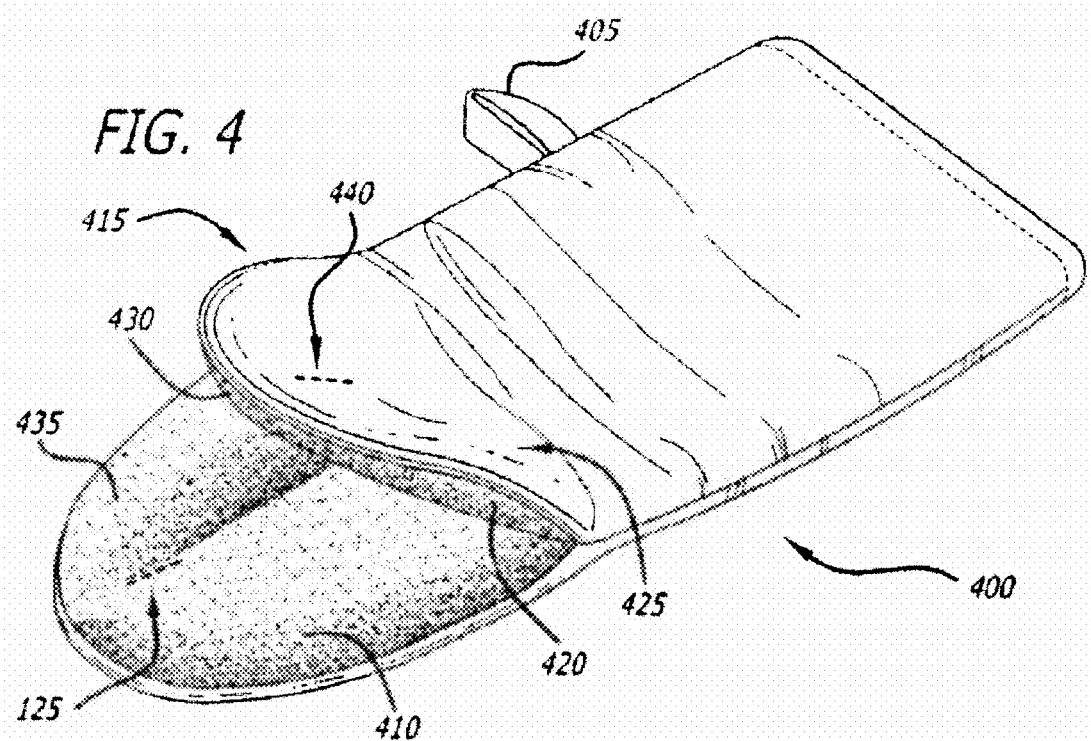
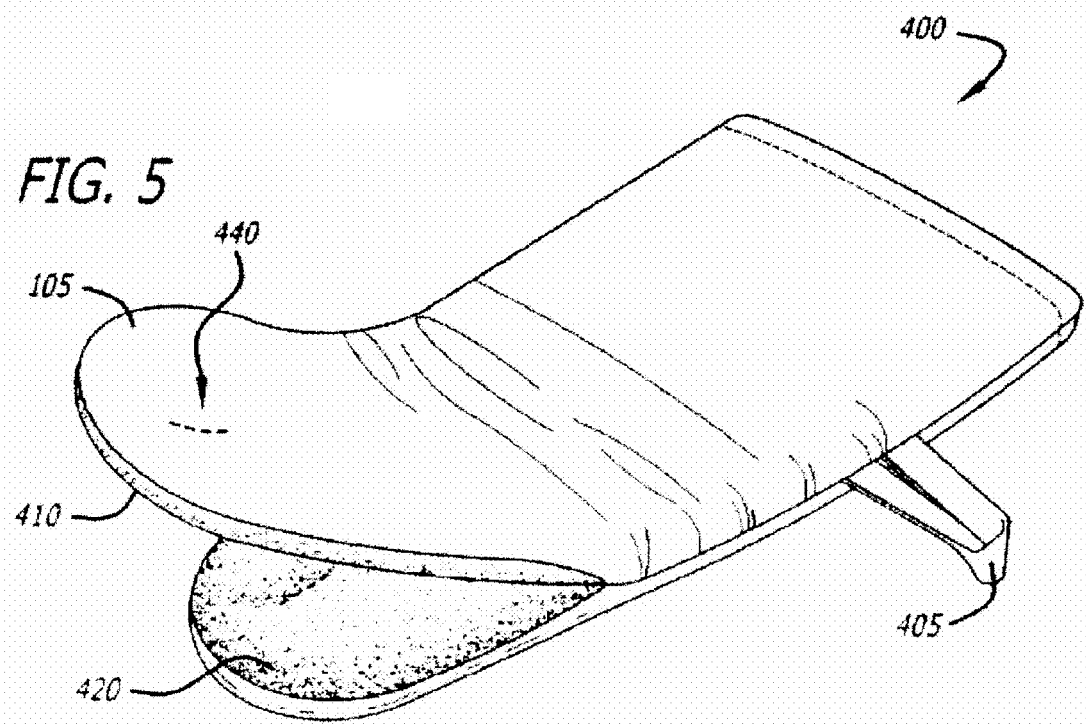

PROTECTIVE HAND COVER

BACKGROUND

1. Field

The invention generally relates to hand covering devices which improve control over objects while protecting the hand from heat. Referring to the figures, exemplary embodiments of the invention will now be described. The exemplary embodiments are provided to illustrate the invention and should not be construed as limiting the scope of the invention.

2. Description of Related Art

Cooking often requires handling pots, pans, dishes, etc. that have been heated to high temperatures. Although the intense heat associated with cooking tools requires care and precision, current devices for handling these items have prevented cooks from exerting a high degree of tactile control over the dangerous articles.

Current oven mitts and potholders shield the user from possible burns by layering padding around the cook's hands. Although this acts well to prevent direct burns from the hot items, the increased padding acts to reduce the cook's control over an item being held. The immense amount of padding leads to the creation of proportionally large hand pockets and the user's hand is able to move without restriction throughout the large pockets. This freedom of movement prevents the user from exercising complete control over held items.

BRIEF DESCRIPTION OF THE DRAWINGS

The Embodiments are illustrated by way of example, and not by way of limitation, in the Figures of the accompanying drawings and in which like reference numerals refer to similar elements and in which:

FIG. 4 illustrates a top view of another embodiment; and

FIG. 5 illustrates a bottom view of another embodiment.

SUMMARY

The invention describes a protective hand covering apparatus which includes a main body made from a first material. The main body consists of an inner face, an outer face connected to the inner face, a hand opening, and a set of dividers for creating compartments between the inner and outer faces. In some embodiments of the invention, a thumb cover is attached to the main body in order to separate the user's thumb from his/her fingers.

DETAILED DESCRIPTION

The Embodiments discussed herein generally relate to protective hand coverings that are firmly secured to the wearer's hand providing the user with a high degree of tactile control over the objects he or she is handling while still guarding the wearer's hand from injuries caused by heat.

Figure 1:
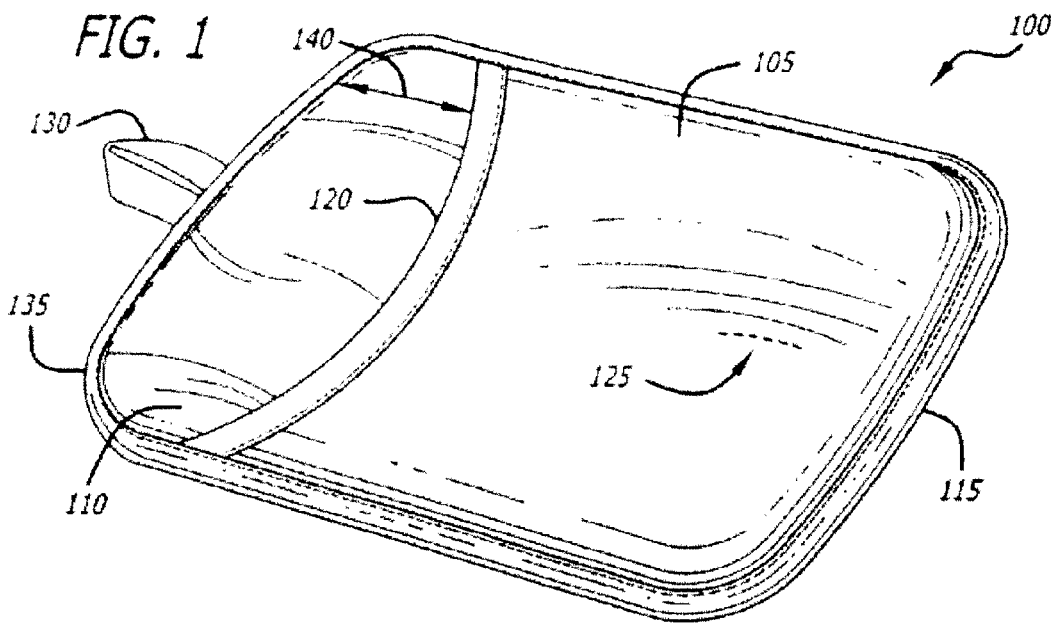
FIG. 1 illustrates a top view of an embodiment.
Figure 2:
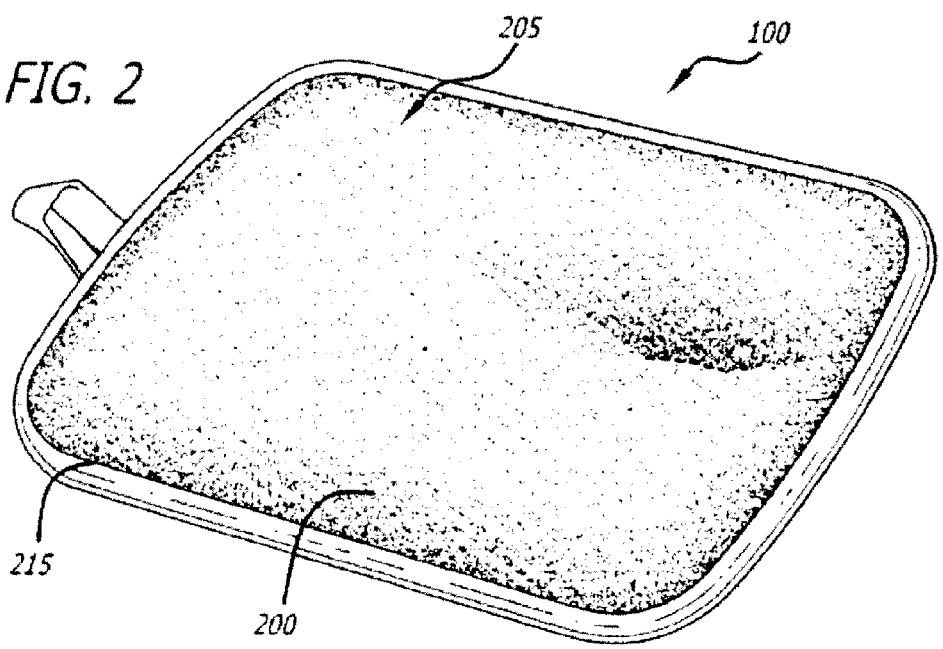
FIG. 2 illustrates a bottom view of the embodiment illustrated in FIG. 1.

FIG. 1 illustrates a top view of one embodiment of a protective hand covering apparatus. Hand cover 100 includes outer edge 135, top side 105 connected to outer edge 135, opening 120 for receiving a hand of a wearer, and means 125 for separating opening 120 into several compartments. These elements form the main body of hand cover 100 of the apparatus upon which multiple embodiments are derived. FIG. 2 illustrates a bottom view of hand cover 100.

In one embodiment, outer edge 135 is formed from bottom side 215 and inner side 110. In other embodiments, bottom side 215 is covered with gripping material 200 such as rubber, polyurethane, polyvinyl, etc. In some embodiments, gripping material 200 includes one or more three-dimensional gripping portions 205 which create greater traction for increased tactile control. Inner side 110 and bottom side 215 are made of materials such as canvas, synthetic leather, cotton, etc. In one embodiment stitching is used to couple bottom side 215 to inner side 110. In other embodiments, bottom side 215 and inner side 110 are attached with fasteners, heat welding, adhesives, polyepoxides, etc.

In one embodiment, top side 105 is made of materials such as canvas, synthetic leather, cotton, etc. In some embodiments, several layers of material are used to give top side 105 a rigid structure.

In some embodiments, the widths of inner side 110 and top side 105 are approximately the same. In other embodiments, inner side 110 and top side 105 take the form of a variety of different shapes that can vary in length. In one embodiment, inner side 110 and top side 105 have a rectangular shape with rounded corners.

In one embodiment, top side 105 is connected to outer edge 135 along a number (e.g. 4) of corresponding edges. Gripping material 200 attached to bottom side 215 is positioned outwardly such that it is fully exposed. In one embodiment stitching is used to connect outer edge 135 and top side 105 together along their edges. In other embodiments, outer edge 135 and top side 105 are attached with fasteners, adhesives, polyepoxides, heat welding, etc. One set of corresponding edges is unattached so that a pocket is formed between outer edge 135 and top side 105 with hand opening 120. The pocket is designed to accommodate a hand of the wearer.

In one embodiment, top side 105 has a length that is smaller than inner side 110. The length difference between top side 105 and inner side 110 is referenced by length difference 140. The pocket formed protects the wrist and lower hand while allowing the wearer to move his/her wrist without being constrained by top side 105. In another embodiment, top side 105 has an identical size to inner side 110.

In one embodiment, the pocket is lined with multiple padding material. The padding insulates to protect the wearer from heat. In one embodiment the padding material is made of materials such as cotton, wool, down, etc. In another embodiment, thermal resistance material is adhered to top side 105 and bottom side 215. In yet another embodiment, the padding material is thermal resistance material.

In one embodiment loop 130 is connected to outer edge 135. Loop 130 is sized to fit around a nail or a hook which would be commonly found in a kitchen or pantry. In one embodiment loop 130 is placed towards the bottom of outer edge 135 such that it does not interfere with the wearer as he/she grips an object. In one embodiment loop 130 is made of materials that do not conduct heat such as canvas, wool, rubber, etc. In other embodiments, loop 130 includes a magnet which allows hand cover 100 to be attached to a metallic object. In other embodiments, loop 130 is placed at one of the corners of hand cover 100.

Figure 3:
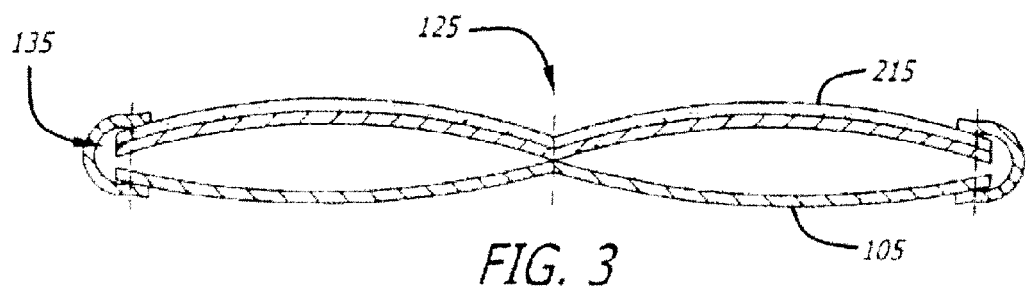
FIG. 3 illustrates a cutaway view of an embodiment.

FIG. 3 illustrates a cut-away view of hand cover 100. In one embodiment top side 105 is connected to outer edge 135 along bottom side 215 with stitches 125. In other embodiments outer edge 135 and top side 105 are connected with fasteners, adhesives, polyepoxides, heat welding, etc. to form finger compartments that separate a wearer's fingers to increase gripping control. In other embodiments, the pocket is divided several times in order to form three, four, five, or more finger compartments for a user's preference of grip control.

The compartments are designed to snugly fit combinations of the wearer's fingers. As a result of the compartment's close proximity to the top edge 115 of hand cover 100, the compartments are slightly beveled toward the fingers of the user. This beveled angle allows fingers to be tightly engaged in the compartment while remaining easily removable from the pocket. In one embodiment, outer edge 135 is beveled toward the fingers of the user. In another embodiment, top side 105 is beveled towards the fingers of the user. In other embodiments, top side 105 and outer edge 135 are both beveled toward the fingers of the user. In yet another embodiment, gripping material 200 is placed inside the compartments. Gripping material 200 provides the user additional traction which improves the user's tactile control over an object.

FIG. 4 illustrates a top view of another embodiment including formed compartments in a hand cover. FIG. 5 illustrates a bottom view of the embodiment illustrated in FIG. 4. As illustrated, hand cover 400 illustrated in FIGS. 4 and 5 include thumb portion 415 and finger portion 410. The use of thumb portion 415 allows the wearer to independently use his/her thumb while grasping objects. Thumb portion 415 has a thumb opening that is capable of receiving the wearer's thumb. The opening of thumb portion 415 is connected to the pocket formed by the outer edge and top side 425 such that thumb portion 415 is accessible from the pocket.

In one embodiment stitching is used to connect thumb portion 415 to hand cover 400 along thumb portion's 415 opening. In other embodiments, thumb portion 415 is attached with fasteners, adhesives, polyepoxides, heat welding, etc. Thumb portion 415 is placed proximate to hand cover's 400 compartments such that the wearer simultaneously places his/her fingers in the compartments and his/her thumb in thumb portion 415.

In some embodiments, thumb portion 415 includes inner side 420 and top side 425. In one embodiment, inner side 420 is covered with gripping material. The gripping material is made of materials such as rubber, polyurethane, polyepoxides, etc. The gripping material may contain one or more three-dimensional gripping portions which create greater traction for increased tactile control. Top side 425 is made of materials such as canvas, simulated leather, cotton, etc. In one embodiment inner side 420 and top side 425 are connected with stitches. In other embodiments, inner side 420 and top side 425 are attached with fasteners, adhesives, polyepoxides, heat welding, etc. In some embodiments, thumb portion 415 is placed so that inner side 420 lays parallel to the outer edge.

In one embodiment, the inside surface of thumb portion 415 is lined with padding material. The padding material insulates to protect the wearer from heat. In some embodiments gripping material is placed inside the thumb compartments. The gripping material provides the user additional traction which improves the user's tactile control over an object.

In one embodiment, loop 405 is connected to outer edge 435. Loop 405 is sized to fit around a nail or a hook which would be commonly found in a kitchen or pantry. Loop 405 is made of materials that do not conduct heat such as canvas, wool, rubber, etc. In other embodiments, loop 405 includes a magnet which allows hand cover 400 to be attached to a metallic object.

Finger portion 410 is similar to thumb portion 415 in construction. In one embodiment, thumb portion 415 has a smaller pocket than finger portion 410. In other embodiments, thumb portion 415 has a larger pocket than finger portion 410. Thumb portion 415 and finger portion 410 overlap one another.

The means for separating the opening of thumb portion 415 into several thumb compartments is accomplished by coupling inner side 420 to top side 425 with separation stitches 440. In other embodiments, inner side 420 and top side 425 are connected with fasteners, adhesives, polyepoxides, heat welding, etc. The separation forms multiple thumb compartments of thumb portion 415. The thumb compartments are designed to snugly fit the wearer's thumb. As a result of the thumb compartments close proximity to top edge 430 of thumb portion 415, the thumb compartments are slightly beveled downward toward the thumb of the wearer. This beveled angle allows the thumb to be tightly engaged in the thumb compartment while remaining easily removable. In one embodiment, inner side 420 is beveled toward the thumb of the user. In another embodiment, top side 425 is beveled towards the thumb of the user. In other embodiments, inner side 420 and top side 425 are both beveled toward the thumb of the user. In yet another embodiment, gripping material is placed inside the thumb compartments. The gripping material provides the user additional traction which improves the user's tactile control over an object.

In some embodiments, the pocket is divided through several times in order to form three, four, five, or more thumb compartments. The multiple thumb compartments allow the user greater choice in determining the placement of his/her thumb.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is not to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus, comprising:
a main body having:
an inner face;
an outer face coupled to the inner face, the inner face and the outer face forming a first pocket; and
a first means for separation which divides the first pocket into multiple finger compartments; and
a thumb covering member coupled to the main body, the thumb covering member having:
a second pocket, wherein the second pocket comprises a closed end and an open end; and
a second means for separation which divides the second pocket into multiple thumb compartments, wherein the second means for separation is proximate to only the closed end of the second pocket.

2. The apparatus of claim 1, wherein the main body comprises a first material and the inner face has a first front side including a second material and a first back side.

3. The apparatus of claim 2, wherein the second material comprises a gripping surface with a plurality of ridges.

4. The apparatus of claim 2, wherein the first material is canvas.

5. The apparatus of claim 2, wherein the first means for separation includes stitching the first front side to the first back side along a first top center region.

6. The apparatus of claim 1, wherein the main body comprises a first material and the thumb covering member has a second front side including a third material and a second back side.

7. The apparatus of claim 6, wherein the third material comprises a gripping surface with a plurality of ridges.

8. The apparatus of claim 6, wherein the second means for separation comprises stitching the second front side to the second back side along a second top center region.

9. The apparatus of claim 1, further comprising a loop coupled to the main body.

10. The apparatus of claim 1, wherein the outer face is coupled to the inner face with a plurality of stitches.

11. The apparatus of claim 1, wherein an opening of the first pocket includes one or more insulating padding elements.

12. The apparatus of claim 1, wherein the first means for separation operates to secure the wearer's hand to the main body.

13. The apparatus of claim 1, wherein the second means for separation operates to secure the wearer's thumb to the thumb covering member.

14. The apparatus of claim 1, wherein the thumb covering member is coupled to the main body such that it is parallel to the main body.

15. A protective hand cover comprising:
a main body, the main body having:
   an inner face;
   an outer face coupled to the inner face, the inner face and the outer face forming a first pocket;
   a first set of separation stitches, which divide the first pocket into multiple finger compartments; and
a secondary body coupled to the main body, the secondary body having:
   a thumb covering portion forming a second pocket, wherein the second pocket comprises a closed end and an open end; and
   a second set of separation stitches which divide the second pocket into multiple thumb compartments, wherein the second set of separation stitches is proximate to only the closed end of the second pocket.

16. An apparatus, comprising:
a first side;
a second side coupled to the first side, the second side and the first side forming a finger pocket dimensioned to receive fingers, the second side having a curved edge defining a portion of an opening of the pocket such that the second side protects the hand without constraining movement of the hand;
a first means for separation which divides less than an entire length of the finger pocket into multiple finger compartments;
a third side coupled to the finger pocket;
a fourth side coupled to the third side, the third side and the fourth side forming a thumb pocket dimensioned to receive a thumb, wherein the thumb pocket comprises a closed end and an open end;
a second means for separation which divides less than an entire length of the thumb pocket into multiple thumb compartments, wherein the second means for separation is proximate to only the closed end of the thumb pocket.

* * * * *